US009954929B2

(12) United States Patent
Hintermeister

(10) Patent No.: US 9,954,929 B2
(45) Date of Patent: Apr. 24, 2018

(54) TECHNIQUES FOR PROMOTING AND VIEWING SOCIAL CONTENT WRITTEN BY NEARBY PEOPLE

(71) Applicant: International Business Machines Corporation, Armonk, NY (US)

(72) Inventor: Gregory R. Hintermeister, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 155 days.

(21) Appl. No.: 14/729,506

(22) Filed: Jun. 3, 2015

(65) Prior Publication Data

US 2016/0359946 A1 Dec. 8, 2016

(51) Int. Cl.
*H04L 29/08* (2006.01)
*H04L 29/06* (2006.01)
*G06F 17/30* (2006.01)

(52) U.S. Cl.
CPC ........ *H04L 67/02* (2013.01); *G06F 17/30876* (2013.01); *H04L 65/4076* (2013.01); *H04L 67/1097* (2013.01); *H04L 67/327* (2013.01)

(58) Field of Classification Search
CPC ...................................................... H04L 67/02
USPC ........................................................ 709/205
See application file for complete search history.

(56) References Cited

U.S. PATENT DOCUMENTS

| 8,707,184 | B2 | 4/2014 | Chen et al. |
| 2005/0064852 | A1 | 3/2005 | Baldursson |
| 2005/0198305 | A1 | 9/2005 | Pezaris et al. |
| 2006/0284744 | A1 | 12/2006 | Shotland |
| 2010/0312857 | A1 | 12/2010 | Ehlers |
| 2012/0317198 | A1* | 12/2012 | Patton .................... G06Q 10/10 709/204 |
| 2014/0053078 | A1 | 2/2014 | Kannan |
| 2014/0081987 | A1 | 3/2014 | Ojanpera |
| 2014/0086510 | A1 | 3/2014 | Couillard et al. |
| 2014/0099880 | A1 | 4/2014 | Thistoll et al. |
| 2014/0136639 | A1 | 5/2014 | Tseng et al. |
| 2014/0244742 | A1 | 8/2014 | Yu et al. |
| 2014/0257953 | A1 | 9/2014 | Kaplan et al. |
| 2015/0339274 | A1* | 11/2015 | Pappu ................ H04N 21/4126 715/205 |

OTHER PUBLICATIONS

Kim et al.; "Social Contents Sharing Model and System Based on User Location and Social Network", 2013 IEEE Third International Conference on Consumer Electronics-Berlin (ICCE-Berlin), Sep. 9-11, 2013, pp. 314-318.

(Continued)

*Primary Examiner* — Adnan Mirza
(74) *Attorney, Agent, or Firm* — Patterson + Sheridan, LLP

(57) ABSTRACT

Techniques are disclosed for promoting and sharing social content for view in a network. An index engine of a network device queries a client device requesting a data connection to the network device for sharable social media content. The index engine receives, in response to the query, the social media content from the client device. The network device indexes the social media content in a data store of the network device. The indexed social media content is transmittable to requesting client devices connected to the network device.

20 Claims, 8 Drawing Sheets

(56) References Cited

OTHER PUBLICATIONS

IP.com et al.; "Method by Which Information Is Shared Given a Time, Date, or Location to Enhanced Historical Significance of Web Based Content", IPCOM000236538D, May 1, 2014, pp. 1-28.
Xing et al.; "Proximiter: Enabling Mobile Proximity-Based Content Sharing on Portable Devices", Pervasive Computing and Communications, PerCom 2009, IEEE International Conference on, Mar. 9-13, 2009, pp. 1-3.
Christin et al.; "Share With Strangers: Privacy Bubbles As User-Centered Privacy Control for Mobile Content Sharing Applications", Information Security Technical Report, ISTR Journal Publication 17(3), 24 Jan. 24, 2013, pp. 1-13.

\* cited by examiner

| Creator ID 301 | Content Link 302 | Timestamp 303 | Social Site ID 304 | Creator Handle 305 | Filter Status 306 | Expiration 307 | Anonymous Status 308 | Keywords 309 |

Content Index Entry 300

FIG. 3 ic # TECHNIQUES FOR PROMOTING AND VIEWING SOCIAL CONTENT WRITTEN BY NEARBY PEOPLE

BACKGROUND

Embodiments presented herein generally relate to sharing content over a network, and more specifically, to sharing social content (e.g., blogs, video, and the like) to users in proximity with one another.

Social media, such as blogs, social networking sites, and user-generated video sites, allows an individual to express information, ideas, and creativity to a wide audience. An individual user may, through an account on a social media site, create content and share that content publicly. The user may then gain a following from other users interested in content shared by that user. For instance, a blog site may allow other users to subscribe to a blog of a particular user. As the blog site acquires more subscribing users, the blog content may reach a wider audience.

Typically, content creators seek an audience to consume social content that they create and share. However, building an audience may be a challenge for some content creators. For example, a common approach to gain an audience for a given user's shared content on a social media page is to advertise the shared content to other users, e.g., on that other user's profile page, through private messages to a user. The other user may click on a link that leads to the shared content and view the shared content. However, such an approach may be intrusive to the other user.

SUMMARY

Embodiments presented herein describe a method. The method generally includes querying, via a network device, a first client device requesting a data connection to the network device for social media content indicated as sharable by the first client device. The method also includes receiving, in response to the query, the social media content from the first client device. The social media content is indexed in a data store of the network device. The indexed social media content is transmittable to requesting client devices connected to the network device.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE SEVERAL VIEWS OF THE DRAWINGS

FIG. 3 illustrates an example content index entry, according to one embodiment.

DETAILED DESCRIPTION

Figure 1:
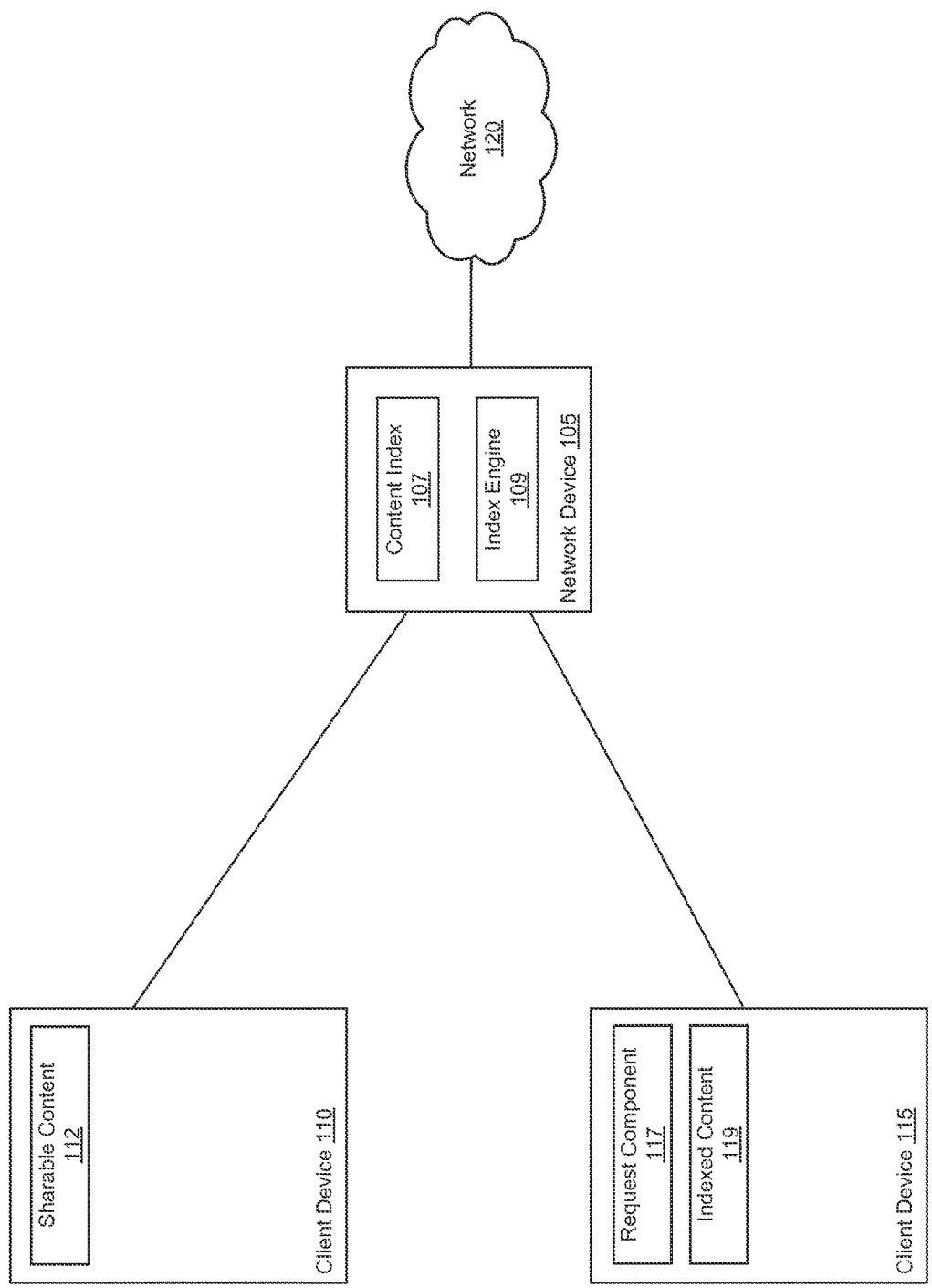
FIG. 1 illustrates an example computing environment, according to one embodiment.

Embodiments presented herein provide techniques for promoting and sharing social content (e.g., user-created blogs, videos, social network profiles, and the like) to users in proximity with one another. In one embodiment, a network device (e.g., a Wi-Fi router, cell tower, etc.) accepts connection requests from client devices (e.g., laptop computers, smartphones, tablet computers, and the like.) that are within proximity of the network device. When the network device accepts a connection request from a client device of a given user, the network device queries the client device to determine whether the client device has any available social content marked as sharable. Sharable content may include a link to a social network profile of a user, to a blog of the user, to individual blog posts, and the like. The client device may return a response to the network device indicating that sharable content is available. The network device requests the sharable content from the client device. In turn, the client device transmits the sharable content to the network device. The network device then indexes the sharable content in a storage location of the network device.

In one embodiment, the network device may broadcast the availability of indexed sharable content to other client devices connected to the network device. Clients connected to the network device may be within close proximity to one another, e.g., customers connected to a Wi-Fi router in a cafe. A given client device may display the available sharable content to a user of the client device. In turn, the user may specify which of the available content to receive from the device. The user may filter the available content by keyword metadata, time, content site, and the like. Doing so allows the user to, for example, scan through content shared throughout the day with the network device. The client device sends the request specifying the desired content to the network device. In turn, the network device retrieves the specified sharable content from the index and sends the content to the client device and displays the content to the user (e.g., by time received, time originally shared, by topic, by content format, etc.).

Advantageously, the techniques described herein allow a user to promote social content to other users in proximity via a network hub that indexes such content. Doing so allows those having common interests with the user to quickly discover and view social content. In addition, the user consequently may gain a wider audience for the content. Further, individuals visiting a location that provides access to a network (e.g., cafes, farmer's markets, amusement parks, etc.) may connect to the network and look for shared social content created during a given period of that time at that location. The shared social content can provide the individuals with insight regarding that location (e.g., interesting farmer's market stands, various amusement park attractions, and the like).

Note, the following uses a wireless router as an example of a network device that indexes sharable content sent by client devices connected to the router. However, one of skill in the art will recognize that embodiments presented herein may be adapted to a wide variety of network equipment. For example, a cell tower may include a data store used to index sharable content by clients that have sharable social content (e.g., links to a blog profile, individual blog posts, social media profile, etc.). The cell tower can advertise such sharable content to other client devices in relative proximity to the sharing client.

FIG. 1 illustrates an example computing environment 100, according to one embodiment. As shown, computing environment 100 includes a network device 105, client devices 110 and 115, and a network 120. In one embodiment, the client devices 110 and 115 may be any kind of physical computing system having a network interface, such as a desktop computer, laptop computer, mobile device, tablet computer, and the like.

In one embodiment, the network device 105 accepts wireless connection requests from devices within proximity to the network device, such as the client devices 110 and 115. The network device 105 provides the devices access to the network 120 (e.g., a private data network, the Internet, etc.). Once connected, the network device 105 forwards data packets between the devices and the network 120. In one embodiment, the network device 120 is a wireless router. Of course, the network device 105 may be a variety of devices that connect the client devices 110 and 115 to the network 120. The network device 105 includes a content index 107 and an index engine 109.

In one embodiment, the index engine 109 allows a client to promote authored social content to other connected clients. Social content may include blogs, social media profiles, individual blog posts, individual social media posts, and the like. A user may authorize a given social media site to share authored content with network devices configured to index sharable content. As a result, the client device 105 can send the sharable content to the network device 105. In addition, the client device 110 may also store a content profile containing content information (e.g., links, post feed data, etc.) that the client device 110 can forward to the network device 105 in response to a query. The index engine 109 receives social content indicated as sharable in a client device 110 (e.g., sharable content 112) and stores the content in the content index 107.

In one embodiment, the index engine 109 may store sharable content 112 by timestamp, creator ID, social media site, and the like in a data store of the network device 105. Doing so allows the index engine 109 to retrieve sharable content 112 by such information for a requesting client device in proximity to the client device 110 (e.g., the client device 115). That is, the client device 115, via a request component 117, may query the network device 115 for available content shared within a particular time period, originating at a particular social media site, authored by a particular creator, and the like. The index engine 109 may then retrieve the specified content from the content index 107 and transmit the content to the client device 115 (as indexed content 119). Thereafter, the client device 115 may display the indexed content 119 to the individual (e.g., as web browser links, links to be opened from an associated mobile application, and the like). As a result, the client device 115 may view sharable content 112 promoted by the nearby client device 110.

Figure 2:
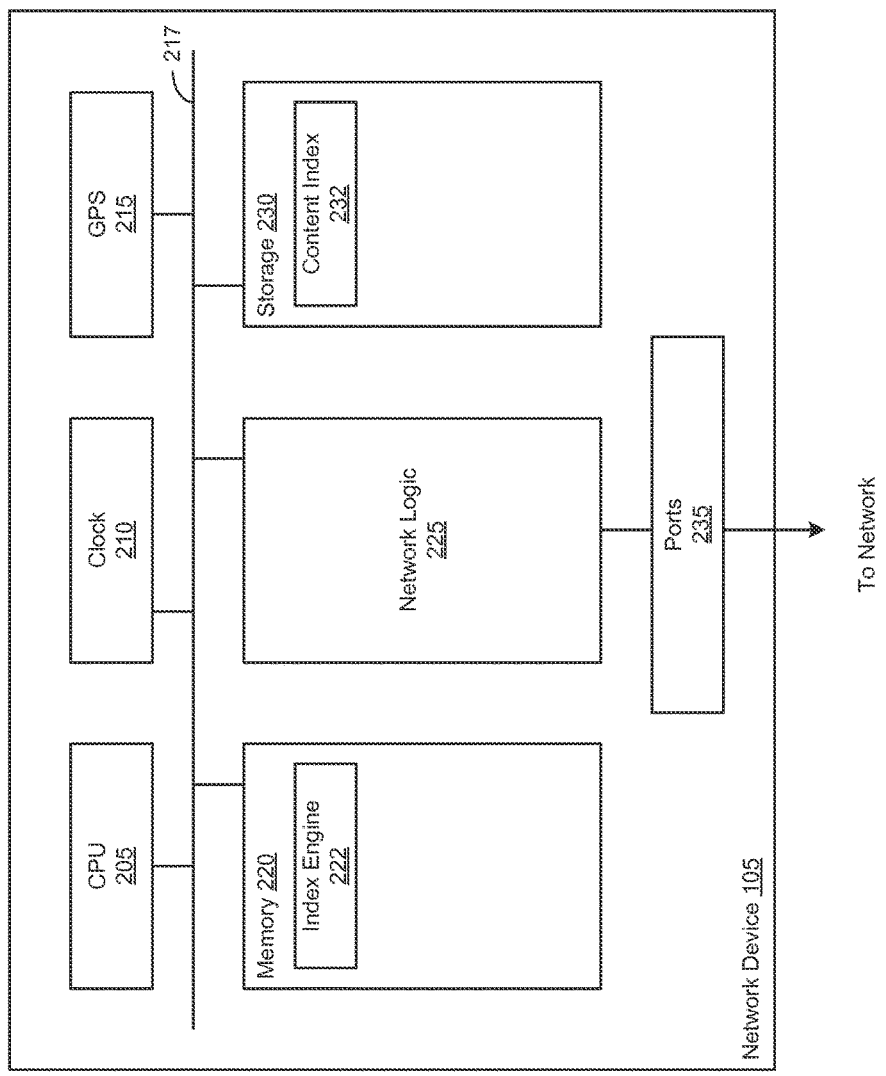
FIG. 2 further illustrates the network device described relative to FIG. 1, according to one embodiment.

FIG. 2 further illustrates the network device 105, according to one embodiment. As shown, the network device 105 includes a CPU (central processing unit) 205, clock 210, a GPS (global positioning system) 215, an interconnect bus 217, a memory 220, a network logic 225, a storage 230, and ports 235. The bus 217 is used to transmit instructions and data between the CPU 205, clock 210, GPS 215, memory 220, network logic 225, and storage 230.

The CPU 205 controls operations of the network device 105 and executes software instructions that are loaded onto the CPU 205. The software instructions may be loaded onto the memory 220. The CPU 205 may use the memory 220 to access stored information and instructions. The clock 210 allows the network device 220 to record timestamps of access connections by client devices, uploading/downloading of sharable content, and the like. The GPS 215 records location information of the network device 105 and location information of connected clients. Doing so allows the network device 105 to determine relative proximity of client devices connected to the network device 105. The network logic 225 includes routing tables that specify forwarding instructions for incoming data packets to and from client devices connected to the network device 105. For example, the network logic 225 may be used to determine a destination port 235 for a given packet.

In one embodiment, the memory 220 includes the index engine 109. As stated, the index engine 109 stores sharable social content to the content index 107 (maintained by the storage 230). To do so, the index engine 109 may query a given client device for sharable content, e.g., during an authentication process for the client device. In response, the client device may determine whether any sharable content is available on the device. If so, the client device sends the sharable content to the network device 105. Further, the client device may also determine whether the client device has sent sharable content to the network device 105 in the past. Doing so allows the client device to send sharable content not previously sent to the network device 105. The index engine 109 receives the sharable content from the client device. In one embodiment, the index engine 109 may scan the sharable content to determine whether the content includes or links to malware. The index engine 109 may dispose the sharable content rather than index the content if the sharable content contains malware. Otherwise, the index engine 109 stores the content in a data store, e.g., the content index 107.

FIG. 3 illustrates an example content index entry 300, according to one embodiment. The index engine 109 stores sharable content to the content index 107 as one or more entries 300. As shown, the content entry 300 may include a creator ID 301, content link 302, timestamp 303, social site ID 304, creator handle 305, filter status 306, expiration 307, anonymous status 308, and keywords 309.

The creator ID 301 specifies a distinct identifier associated with a client device. The creator ID 301 allows the index engine 109 to identify sharable content sent to the network device 105 by a given client device. The content link 302 specifies a URL (uniform resource locator) to the sharable content associated with the entry 300. The timestamp 303 indicates a date and time that the entry 300 was created. The social site ID 304 specifies an identifier corresponding with the social media service associated with the entry 300. The creator handle 305 specifies a username or handle associated with the social content of the entry 300.

The filter status 306 specifies certain content filters associated with the content entry 300. For example, the shared content may include metadata provided by the associated site indicating that the content is unsuitable for minors. In such a case, the filter status 306 may flag the content as such.

The expiration 307 indicates a time period for the shared content to remained indexed on the network device 105. When the network device 105 indexes the entry 300, the network device 105 may start a timer and measure a time period to the expiration of the entry 300. After the period has elapsed, the network device 105 may remove the entry 300 from the content index 107.

In one embodiment, a client device may indicate, prior to transmitting the sharable content to the network device 105, that sharable content is anonymous. An individual may want to indicate sharable content as anonymous in a situation where a relatively low amount of individuals are present in a given location. For example, assume a cafe providing wireless internet access (e.g., through the network device 105) has two individuals present. One of the individuals may desire more individuals to enter the cafe prior to sharing content with the network to avoid being easily identified as the individual sharing content with the network. In such a case, the individual may flag sharable content as anonymous. If so flagged, the network device 105 may delay broadcast of availability of the content until a specified amount of clients connect to the network device 105.

Keywords 309 indicate metadata tags and the like associated with the shared content. The keywords 309 may be specified manually by the creator or by the underlying social media site.

Of course, the data described above are examples of information that the index engine 109 may include in a content index entry. One of skill in the art will recognize that an entry 300 may include various kinds of other information not described herein.

Figure 4:
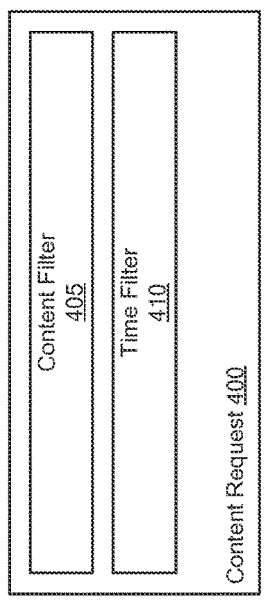
FIG. 4 illustrates an example content request, according to one embodiment.

FIG. 4 illustrates an example content request 400, according to one embodiment. In one embodiment, a client device may request shared content from the network device 105 and specify what types of content to receive by filtering entries 300 by any of the data described above. As shown, a content request 400 may include a content filter 405 and a time filter 410. The content filter 405 specifies filters on sharable content to receive. For example, the content filter 405 can specify filters based on mature content, keyword tags, creator handle, posts from a given site, etc. The time filter 410 allows the client to query the network device 105 for content sent to the network device 105 from a given time period.

Figure 5:
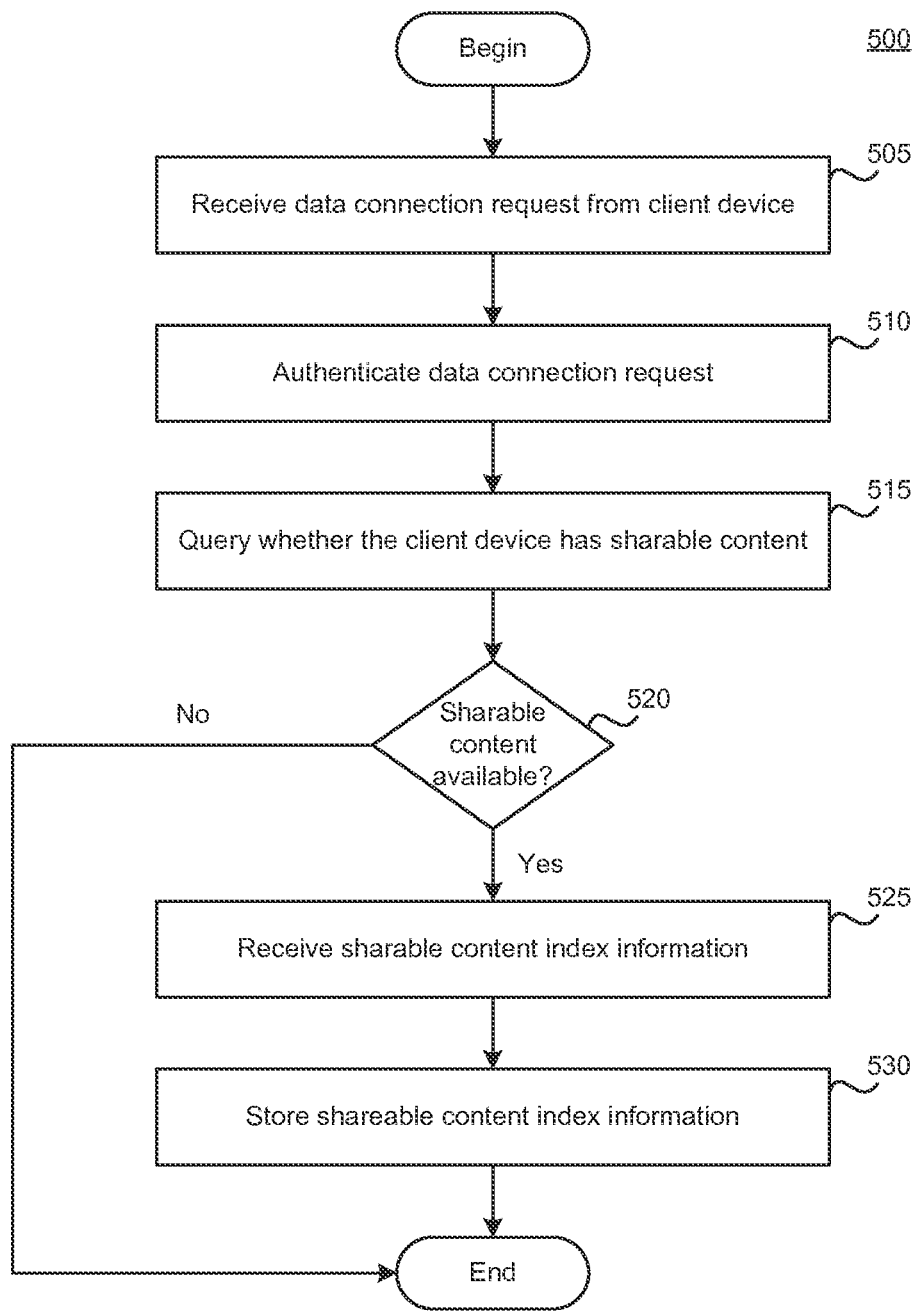
FIG. 5 illustrates a method for indexing sharable content of a client, according to one embodiment.

FIG. 5 illustrates a method 500 for indexing sharable content received from a client device, according to one embodiment. As shown, method 500 begins at step 505, where the network device 105 receives a data connection request from a client device (e.g., client device 105). At step 510, the network device 105 authenticates the connection request.

At step 515, the network device 105 queries the client device 105 for available sharable content. In turn, the client device 105 may determine whether any social content indicated as sharable is available. Further, as stated, if the client device 105 has previously sent sharable content to the network device 105, the client device 105 may determine whether any new sharable content is available.

At step 520, the network device 105 determines whether content is available. If the client device 105 has sharable content to send to the network device 105, then at step 520, the network device 105 receives the sharable content from the client device 105. The network device 105 then indexes the sharable content into separate entries. Each entries include information such as creator ID, content URL, a timestamp, and the like.

Figure 6:
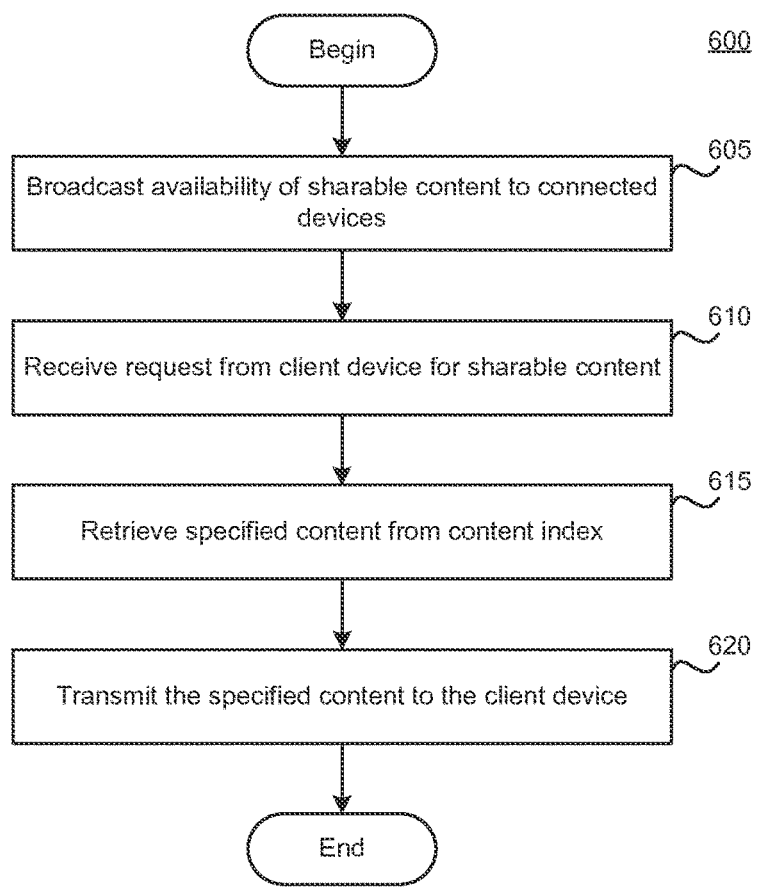
FIG. 6 illustrates a method for transmitting indexed content to a requesting client, according to one embodiment.

FIG. 6 illustrates a method 600 for transmitting indexed sharable content to a requesting client device, according to one embodiment. As shown, method 600 begins at step 605, where the network device 105 broadcasts availability of sharable content to client devices connected to the network device 105 (e.g., client device 115).

At step 610, the network device 105 receives a request from the client device 115 for sharable content. The request may specify one or more filters for content to retrieve from the content index 107. For example, the filters may specify content authored by a given creator, content uploaded in the last five hours, content that is not flagged as mature content, etc. At step 615, the index engine 109 retrieves the specified content from the content index 107. At step 620, the index engine 109 sends the specified content to the client device 115.

Figure 7:
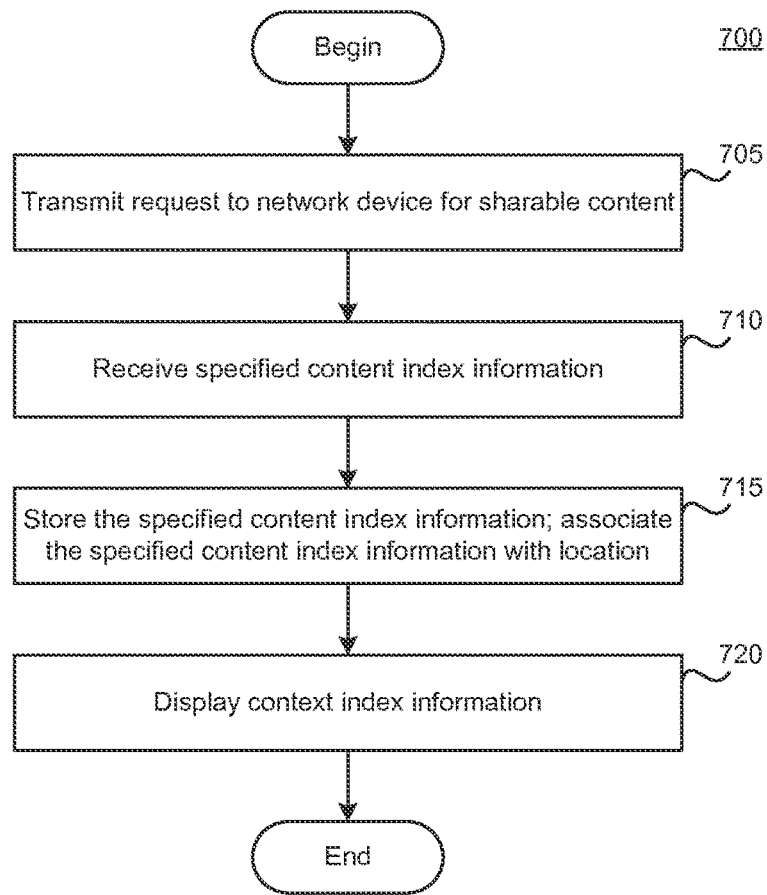
FIG. 7 illustrates a method for receiving sharable content from a network device, according to one embodiment.

FIG. 7 illustrates a method 700 for receiving indexed sharable content from a network device, according to one embodiment. As shown, method 700 begins at step 705, where the client device 115 transmits a request to the network device for sharable content. As stated, the request may specify one or more filters for content to retrieve from the content index 107. In turn, the network device 105 sends the requested content to the client device 115. And at step 710, the client device 115 receives the requested sharable content.

At step 715, the client device 115 stores the sharable content in a local index. Further, in one embodiment, the client device 115 associates the indexed sharable content with the network device 115. Doing so allows the client device 115 to organize various sharable content retrieved at different locations.

At step 720, the client device 115 displays the sharable content to a user of the client device 115. The client device 115 may display the sharable content as a selectable list of indexed entries. The list may be organized as specified by the user, e.g., by content creator, by social media site, by most recently updated content, etc. The user may then select which of the content to view.

Figure 8:
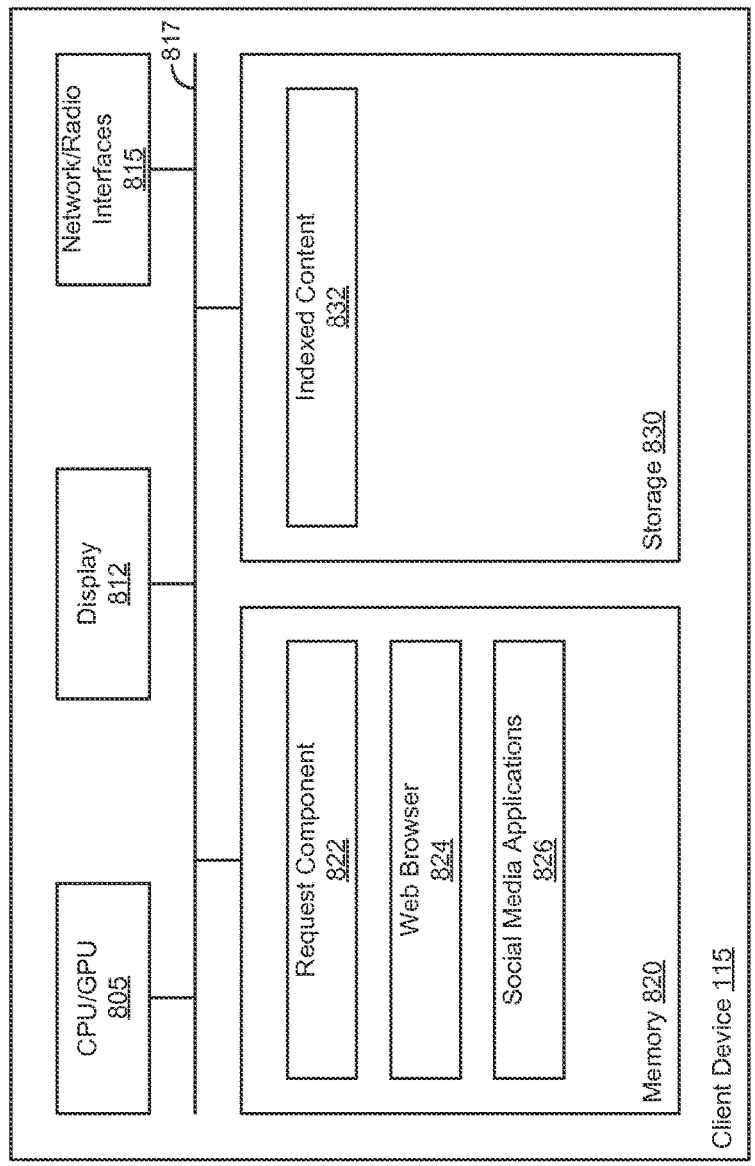
FIG. 8 further illustrates the client device described relative to FIG. 1, according to one embodiment.

FIG. 8 further illustrates the client device 115 configured to request sharable content from the network device 105, according to one embodiment. As shown, the client device 115 includes, without limitation, a CPU/GPU (central processing unit/graphics processing unit) 805, a display 812, network/radio interfaces 815, an interconnect bus 817, a memory 820, and a storage 830. In one embodiment, the client device 115 is representative of a mobile device. Of course, the client device 115 will include a variety of additional hardware components.

The CPU/GPU 805 retrieves and executes programming instructions stored in memory 820. Similarly, the CPU/GPU 805 stores and retrieves application data residing in the storage 830. The interconnect bus 817 is used to transmit instructions and data between the CPU/GPU 805, display 812, network/radio interfaces 815, memory 820, and storage 830. The CPU/GPU 805 is included to be representative of a single CPU, multiple CPUs, a single CPU having multiple processing cores, and the like. And the memory 820 is generally included to be representative of memory and storage on a mobile device, e.g., DDR and flash memory spaces.

Illustratively, memory 820 includes a request component 822, a web browser 824, and one or more social media applications 826. And the storage 830 includes indexed content 832. In one embodiment, the request component 822 may be a module in the web browser 824, social media applications 826, or as a standalone component. In one embodiment, the request component 822 receives broadcasts from the network device 105 indicating the availability of sharable social content. The request component 822 may display available content as a selectable list for the user, e.g., organized by date, content type, content creator, and the like. A user may specify, via the request component 822, which of the available content to receive by selecting desired content. Further, the user may also specify available content to receive by using filters on the content itself (e.g., by creator, social media site, etc.) or time filters (e.g., shared within the last three days, shared within the last three hours, shared since the beginning of time, etc.).

Once the request component 822 receives the specified content from the network device 105, the request component 822 may store the content in storage 830, e.g., as indexed content 832. The request component 822 may organize the indexed content 832 by various properties, such as by the network in which the specified content was received, by creator name, by site name, and the like. The request component 822 may display the content index to the user as a list, allowing the user to select and view desired content.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the index engine) or related data available in the cloud. For example, the network device may be a virtual router executing on the cloud, and the index engine could execute on the virtual router. In such a case, the index engine could receive shared content from client devices and index the sharable content at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer program product to promote sharing of user-generated content based on user proximity to a given venue, while safeguarding user privacy at the given venue, the computer program product comprising:
   a computer-readable storage medium having computer-readable program code embodied therewith, the computer-readable program code executable by one or more computer processors to perform an operation comprising:
      receiving, via a network and from a first of a plurality of client devices at the given venue, a request for a data connection to a network device, the first client device having an associated user;
      querying, by the network device, the first client device for user-generated content authored by the user and indicated as sharable by the first client device;
      receiving, in response to the query, the user-generated content from the first client device, wherein the user-generated content was generated by a user presently at the given venue;
      indexing the user-generated content in a data store of the network device, wherein the indexed user-generated content is transmittable to requesting client devices connected to the network device in order to promote sharing of user-generated content based on user proximity to the given venue; and
      delaying transmission of the user-generated content to the requesting client devices until a threshold number of users are identified as being proximate to the given venue, in order to safeguard user privacy by forestalling user identification of the user at the given venue as being a creator of the user-generated content.

2. The computer program product of claim 1, wherein the operation further comprises:
   upon indexing the user-generated content, starting a timer; and
   after the timer measures a specified time period, removing the indexed user-generated content from the data store.

3. The computer program product of claim 2, wherein the operation further comprises:
   upon indexing the user-generated content, starting a timer; and
   determining that the user-generated content includes metadata specifying to delay broadcasting availability of the user-generated content to other client devices; and
   after the timer measures a specified time period, broadcasting the availability of the user-generated content to the other client devices.

4. The computer program product of claim 1, wherein the operation further comprises:
   broadcasting availability of a plurality of user-generated content to a second client device connected to the network device, wherein the plurality of user-generated content includes the user-generated content received from the first client device.

5. The computer program product of claim 4, wherein the operation further comprises:
   receiving a request from the second client device specifying the user-generated content received from the first client device;
   retrieving the specified user-generated content from the data store; and
   sending the specified user-generated content to the second client device.

6. The computer program product of claim 4, wherein the operation further comprises:
   receiving a request from the second client device specifying a filtered subset of the plurality of user-generated content;
   retrieving the specified user-generated content from the data store; and
   sending the specified user-generated content to the second client device.

7. A network device to promote sharing of user-generated content based on user proximity to a given venue, while safeguarding user privacy at the given venue, the network device connecting a plurality of client devices to a network, the network device comprising:
   one or more computer processors; and
   a memory storing a program which, when executed on the one or more computer processors, performs an operation comprising:
      receiving, via a network and from a first of a plurality of client devices at the given venue, a request for a data connection, the first client device having an associated user;
      querying the first client device for user-generated content authored by the user and indicated as sharable by the first client device;
      receiving, in response to the query, the user-generated content from the first client device;
      indexing the user-generated content in a data store of the network device, wherein the indexed user-generated content is transmittable to requesting client devices connected to the network device in order to promote sharing of user-generated content based on user proximity to the given venue; and
      delaying transmission of the user-generated content to the requesting client devices until a threshold number of users are identified as being proximate to the given venue, in order to safeguard user privacy by forestalling user identification of the user at the given venue as being a creator of the user-generated content.

8. The network device of claim 7, wherein the operation further comprises:
   upon indexing the user-generated content, starting a timer;
   after the timer measures a specified time period, removing the indexed user-generated content from the data store.

9. The network device of claim 8, wherein the operation further comprises:
   upon indexing the user-generated content, starting a timer; and
   determining that the user-generated content includes metadata specifying to delay broadcasting availability of the user-generated content to other client devices; and after the timer measures a specified time period, broadcasting the availability of the user-generated content to the other client devices.

10. The network device of claim 7, wherein the network device is one of at least a router or a cell tower.

11. The network device of claim 7, wherein the operation further comprises:
  broadcasting availability of a plurality of user-generated content to a second client device connected to the network device, wherein the plurality of user-generated content includes the user-generated content received from the first client device.

12. The network device of claim 11, wherein the operation further comprises:
  receiving a request from the second client device specifying a filtered subset of the plurality of user-generated content;
  retrieving the specified user-generated content from the data store; and
  sending the specified user-generated content to the second client device.

13. The network device of claim 12, wherein the network device operatively connects the plurality of client devices to the network, wherein the indexed user-generated content is transmitted to requesting client devices connected to the network device and proximate to the given venue, wherein the user-generated content is indexed by an index engine executing on the network device, wherein the request specifying a filtered subset comprises a content request that includes a content filter and a time filter, wherein the content filter specifies a desired content topic and a desired content format, wherein the time filter specifies a desired time range during which user-generated content was posted.

14. The network device of claim 13, wherein the user-generated content includes a creator identifier, a timestamp, a content Uniform Resource Locator (URL), and keyword metadata, wherein the network device is, in respective instances, a wireless network router and a cell tower, wherein the operation further comprises:
  receiving a request from the second client device specifying the user-generated content received from the first client device;
  retrieving the specified user-generated content from the data store; and
  sending the specified user-generated content to the second client device.

15. The network device of claim 14, wherein the operation further comprises:

upon indexing the user-generated content, starting a removal timer; and
after the removal timer measures a specified time period, removing the indexed user-generated content from the data store.

16. The network device of claim 15, wherein the operation further comprises:
  upon indexing the user-generated content, starting a delay timer;
  determining that the user-generated content includes metadata specifying to delay broadcasting availability of the user-generated content to other client devices; and
  after the delay timer measures a specified time period, broadcasting the availability of the user-generated content to the other client devices.

17. The network device of claim 16, wherein the index engine is configured to maintain a content index in the data store, wherein the content index includes a plurality of content entries storing the metadata, each content entry of which includes a plurality of fields, the plurality of fields including a creator identifier field, a content link field, a timestamp field, a social site identifier field, a creator handle field, a filter status field, an expiration field, an anonymous status field, and a keywords field.

18. The network device of claim 17, wherein the creator identifier field specifies a distinct identifier associated with the client device, wherein the content link field specifies a URL to the user-generated content, wherein the timestamp field specifies a date and time that the content entry was created, wherein the social site identifier field comprises an identifier corresponding to a user-generated service associated with the content entry, wherein the creator handle field specifies a username associated with the social content.

19. The network device of claim 18, wherein the filter status field specifies one or more content filters associated with the content entry, including whether the content entry is unsuitable for minors, wherein the expiration field specifies a desired time period for the shared content to remained indexed on the network device, wherein the keywords fields specifies one or more keywords associated with the user-generated content.

20. The network device of claim 19, wherein the anonymous status field specifies whether to preclude the user-generated content from being shared when fewer than the threshold number of users are identified as being proximate to the given venue, wherein the given venue comprises, in respective instances, a theme park and a farmer's market.

* * * * *